US007258826B2

(12) United States Patent
Bales

(10) Patent No.: US 7,258,826 B2
(45) Date of Patent: Aug. 21, 2007

(54) LOW DUST PRESERVATIVE POWDERS FOR LIGNOCELLULOSIC COMPOSITES

(75) Inventor: Stephen G. Bales, Sewell, NJ (US)

(73) Assignee: Lord's Additives LLC, Sewell, NJ (US)

( * ) Notice: Subject to any disclaimer, the term of this patent is extended or adjusted under 35 U.S.C. 154(b) by 0 days.

(21) Appl. No.: 10/909,053

(22) Filed: Jul. 30, 2004

(65) Prior Publication Data

US 2007/0001337 A1 Jan. 4, 2007

Related U.S. Application Data

(60) Provisional application No. 60/495,296, filed on Aug. 15, 2003.

(51) Int. Cl.
*B29C 70/00* (2006.01)
*C09K 15/02* (2006.01)
*B28B 5/00* (2006.01)
*B28B 3/00* (2006.01)
*C09K 21/02* (2006.01)

(52) U.S. Cl. ...................... 264/122; 264/241; 252/607; 252/385; 106/15.05

(58) Field of Classification Search ................ 264/122, 264/241; 252/607, 385; 106/15.05
See application file for complete search history.

(56) References Cited

U.S. PATENT DOCUMENTS 2,653,674 A * 9/1953 Ortgies ....................... 422/169
2,693,950 A * 11/1954 Calder ......................... 299/76
3,757,491 A * 9/1973 Gourdine ....................... 96/27
4,068,893 A * 1/1978 Weirich ....................... 299/43
4,463,108 A * 7/1984 Wagner et al. ............. 523/216
4,879,083 A 11/1989 Knudson et al.
5,094,829 A * 3/1992 Krivak et al. ............... 423/339
5,130,352 A * 7/1992 Chow .......................... 524/13
5,221,781 A * 6/1993 Aida et al. .................. 524/433
5,514,478 A * 5/1996 Nadkarni .................... 428/469
5,527,482 A * 6/1996 Pullen et al. ............. 252/88.1
5,763,338 A 6/1998 Sean
5,972,266 A 10/1999 Fookes et al.
6,030,562 A 2/2000 Lehtinen et al.
6,368,529 B1 4/2002 Lloyd et al.
6,723,352 B2 4/2004 Bosserman
6,790,906 B2 9/2004 Chaignon et al.
2002/0182431 A1 12/2002 Hatton et al.

OTHER PUBLICATIONS

Peter Laks, "Protecting Wood Composites", Pioneer Magazine, Jul. 1995 p. 1-3.
Peter Laks and Mark Manning, "Preservation of Wood Comosites with Zinc Borate", Paper for the International Research Group on Wood Preservation, Jun. 1995.

(Continued)

*Primary Examiner*—Christina Johnson
*Assistant Examiner*—Matthew J. Daniels

(57) ABSTRACT

The manufacture of zinc borate and calcium borate powders in a water slurry and drying those powders in a controlled manner such as to leave a desired residual of moisture content uniformly dispersed throughout the product produces a low dust, flowable material. This low dust material results in environmental and economic benefits to users of these preservative borates. The preferred amount of residual moisture is from 2 to 10 percent.

12 Claims, 2 Drawing Sheets

OTHER PUBLICATIONS

Trek Sean< Giles Brunette, and Francis Cote, "Protection of Oriented Strandboard with Borate" Forest Products Journel, V 49, Jun. 1999, p. 47-51.

Frank Hamelmann and Eberhard Schmidt, "Methods of Estimating the Dustiness of Industrial Powders- A Review" KONA-Powder Science & Technology in Japan, 2003, p. 7-18.

TSI Corporation, "AeroFlow Powder Flowability Analyzer" 2002 p. 1-2.

Mark Manning, "Minutes from Subcommittee N-5 meeting in Vancouver, B. C. on May 19, 2004" AWPA technical memorandum, Jul. 1, 2004.

Michael Briggs, "Calcium Containing Borates", Kirk-Othmer Encyclopedia of Chemical Technology, Sec 8.0, p. 1.

David R. Lide, Editor CRC Handbook of Chemistry and Physics, Ed. 86, 2005, p. 4-96.

Environmental Protection Agency, Technical Resource Doc. Solidification/Stabilization and its Application to Waste Materials. Jun. 1993, 60 pages, attention to p. 3-2.

* cited by examiner

LOW DUST PRESERVATIVE POWDERS FOR LIGNOCELLULOSIC COMPOSITES

CROSS-REFERENCE TO RELATED APPLICATIONS

Ser. No. 60/495,296—filing Aug. 15, 2003

FEDERALLY SPONSORED RESEARCH

None

SEQUENCE LISTING

None

BACKGROUND

This invention relates to the lignocellulosic-based composite products which are resistant to insect and fungal attack.

BACKGROUND OF THE INVENTION

There is a very high demand for wood products. Although wood is a renewable resource, it takes many years for trees to mature. Consequently, the supply of wood suitable for use in construction is decreasing and there is a need to develop alternative materials. One alternative has been the use of composites of lignocellulosic materials in applications which require resistance to wood-destroying organisms such as fungi and insects. This requires treatment of these composites with a wood preserving material.

Traditionally, solid wood products are dipped or pressure treated with solutions of fungicides to provide resistance to fungus and mould damage. However with a composite material, the fungicide can be incorporated during its production. This approach yields a product in which the composite has a constant loading of preservative throughout its thickness, strengthening its resistance to leaching and increasing the effectiveness of the preservative.

Borates have been used as wood preservatives for several decades with efficacy against wood decay organisms such as fungi and termites. Although boric acid, borax, and disodium octaborate tetrahydrate (DOT) have been used for treating solid wood products by dipping or pressure treatment, these water soluble borate chemicals are incompatible with some resins used to bind the composite materials thus weakening the bond strength of those products. The leach rate of these water soluble materials has also been of concern. It has been shown in U.S. Pat. No. 4,879,083 issued Nov. 7, 1989 to Knudson et al, to apply anhydrous borax or zinc borate to the wood strand and bond the strands together into a composite product resistant to decay by insects and/or fungus using phenol formaldehyde as the binding agent. Zinc borate in particular has been used successfully to treat wood composites such as oriented strand board (OSB), fiberboard, and particle board. However zinc borate is produced and commercially marketed as a dry powder at less than 1 percent, and typically at 0.2%, moisture content). This results in an economic issue since a significant amount of the powder can be lost during the production of composite products and a workplace environmental issue due to dust loss during the manufacturing of these composite products. U.S. Pat. No. 5,972,266 issued in Oct. 26, 1999 to Fookes et al. shows that zinc borate could be applied to a wood composite product by forming a sprayable aqueous dispersion of zinc borate particles having a zinc borate content in the range of 20 to 75% by weight and applying said dispersion on surfaces of the wood strands. Although this approach does reduce the zinc borate lost during manufacturing of lignocellulosic composites, it requires additional processing equipment, necessitates modifications to the composite manufacturing system, and introduces operational complexity during that processing.

U.S. Pat. No 6,368,529 issued Apr. 9, 2002 to Lloyd, et al. describes the use of calcium borate as an additive to lignocellulousic based composites to increase their resistance to insect and fungal attack. No form of calcium borate has been commercially used for this purpose. When calcium borate, natural or synthetic, has been commercially produced for use as a fire retardant, it has been in the form of a dry powder. As a result, the use of this material in a commercial scale wood composite production process would present dusting problems similar to those associated with zinc borate.

SUMMARY AND OBJECTIVES OF THE INVENTION

It is the objective of this invention to develop a method of incorporating water insoluble borates, calcium borate and zinc borate, into lignocellulosic composite materials in a manner that eliminates the current problems caused by dusting of these materials: the economic loss of these materials during composite production and the workplace environmental issue that must be mitigated by the composite producer.

The invention utilizes the fact that when zinc borate or calcium borate is produced in a water slurry, and the final drying process is controlled to achieve a desired moisture concentration this residual moisture is uniformly distributed throughout the material. This approach produced two surprising results: a final moisture content of as low as 2% produces a significant reduction in dusting and material with moisture content as high as 10% has flowability properties comparable to material with no moisture content.

DETAILED DESCRIPTION

The lignocellulosic composite materials described in this invention are produced using well known procedures which combine the lignocellulosic particles with a binder and a wax, then apply heat and pressure to form the composite product. The low water soluble borate, either zinc borate or calcium borate, is incorporated by adding the powder to the particles, the binder, or the wax prior to the application of heat and pressure. These borates are effective fungicidal and insecticidal compounds that are relatively inexpensive, easy to store, handle and use.

Generally the lignocellulosic material is processed into small particles, mixed with an adhesive binder and a wax, and then pressed into a final product. This is a dry process, but by using borate powders with the prescribed moisture content, this invention allows the application of these preservative materials while minimizing the airborne discharge of borate particles and thereby minimizing material loss and environmental issues.

The borates used in the method of this invention are manufactured in a water slurry process and then dried. This invention controls the drying process to allow a residual moisture content of 1% to 20% by weight in the material. The preferred moisture content is 2% to 10%. This moisture significantly reduces the dusting potential of these materials, but is low enough that the borates maintain flow parameters that are necessary for production of the lignocellulosic composite material.

The particle size of the zinc borate and calcium borate is not critical, but does need to be of a size that can be dispersed in the composite product. Generally an average particle size as large as 200 microns to as small as 1 micron can be used, with 5 to 20 microns being the preferred range.

The amount of borate material is between 0.2 to 3.0 percent which is sufficient to control fungal decay and insect attack, with a preferred amount being 0.5 to 2.0 percent.

EXAMPLES

Example 1

Dust level measurements were taken on samples of regular zinc borate with a moisture content of 0.1% and low dust zinc borate with moisture content of 2%. The testing was performed using the single-drop concept described in Methods of Estimating the Dustiness of Industrial Powders using the following configuration. The test setup consisted of a test chamber measuring 16"×12"×12" with the suction tube from a TSI DustTrak located in the geometric center of the 12"×12" opening.

Figure 1:
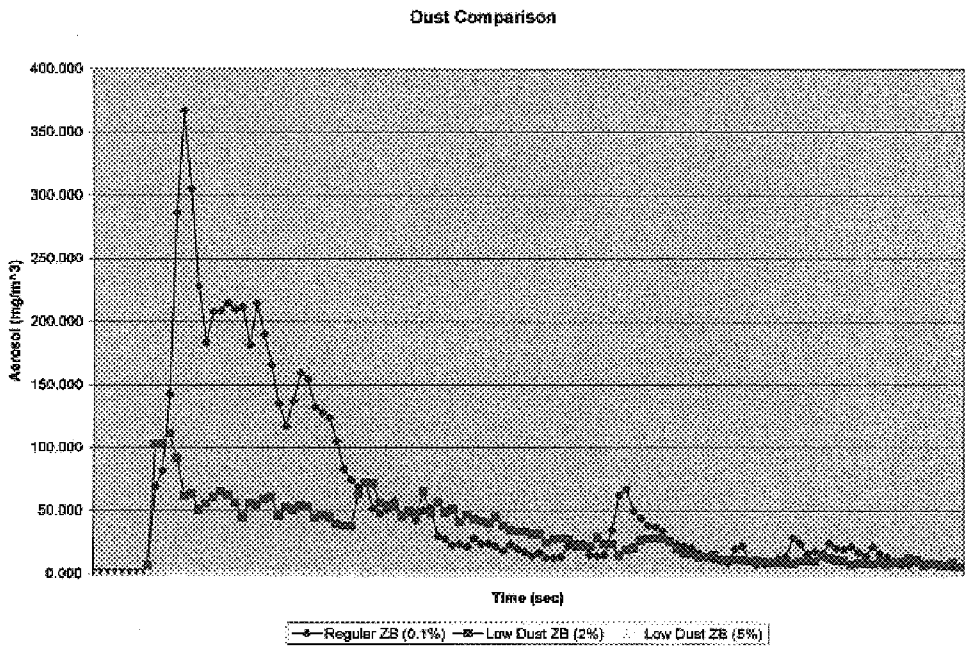
FIG. 1 provides the comparison of the dust generated by during a drop test by zinc borate samples containing 0.1%, 2%, and 5% moisture.

A six ounce sample was dropped from the top of the test chamber where it fell 16" generating a dust cloud. The resulting aerosol contents were drawn into the DustTrak's suction tube and measured by the instruments optical system. Since the literature reports that single-drop testing can result in a variation of results for a given sample that are higher than alternate methods, ten samples of each zinc borate type were tested. The resulting averages of the aerosol contents for 120 seconds after discharge are presented in Table 1 and FIG. 1. The resulting measurements from the low dust samples were significantly lower than those of the regular zinc borate material.

Example 2

Figure 2:
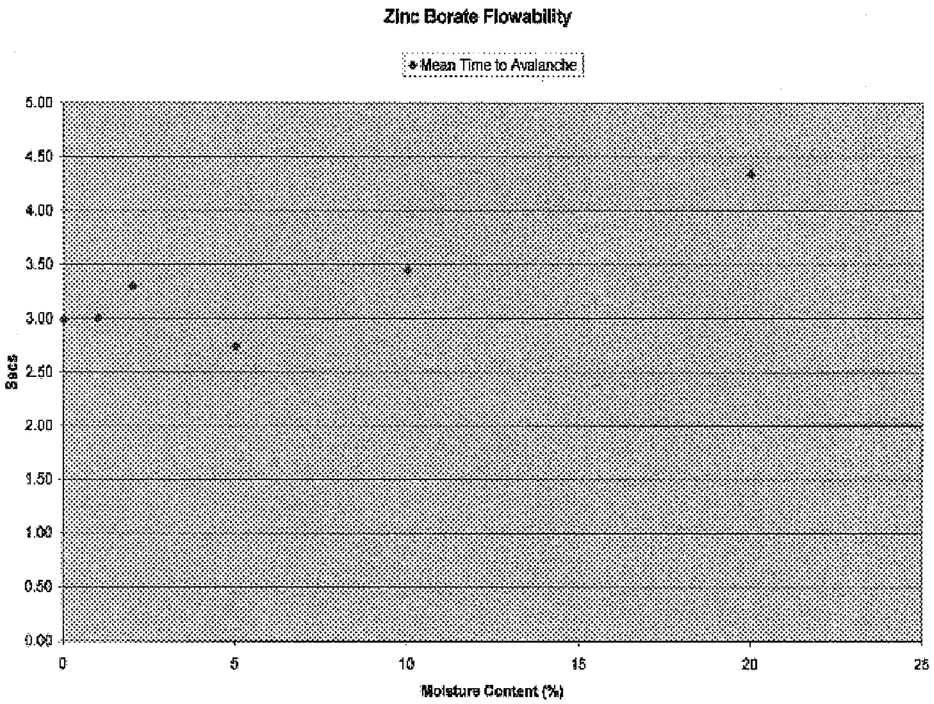
FIG. 2 provides the flow characteristics of zinc borate samples with moisture contents ranging from 0% to 20%.

The relative flowability characteristics of zinc borate with varying amounts of moisture content was compared using the Aeroflow Powder Flowability Analyzer 3250. This instrument quantifies the flowability of powders by providing a metric called the mean time to avalanche. Free flowing powders produce a shorter mean time to avalanche. Zinc Borate with moisture content of 0.1 (regular material currently in commercial use), 1%, 2%, 5%, 10% and 20% was analyzed using the Aeroflow instrument. A total of ten runs were made at each moisture level and the average of those runs is presented in Table 2 and FIG. 2. The results indicate that flowability of zinc borate powder with moisture from 1% to approximately 10% is comparable to the no moisture material, and at 5% was superior to the no moisture product.

Having described the invention, modifications will be evident to those skilled in the art without departing from the scope of the invention as defined in the appended claims.

TABLE 1

| Time (sec) | Regular ZB (0.1%) mg/m^3 | Low Dust ZB (2%) mg/m^3 | Low Dust ZB (5%) mg/m^3 |
|---|---|---|---|
| 1 | 0.088 | 0.089 | 0.088 |
| 2 | 0.089 | 0.089 | 0.088 |
| 3 | 0.087 | 0.088 | 0.090 |
| 4 | 0.089 | 0.088 | 0.090 |
| 5 | 0.087 | 0.089 | 0.087 |
| 6 | 0.087 | 0.089 | 0.088 |
| 7 | 0.088 | 0.088 | 0.088 |
| 8 | 6.398 | 6.368 | 0.291 |
| 9 | 68.861 | 102.907 | 0.093 |
| 10 | 81.748 | 103.453 | 0.406 |
| 11 | 142.315 | 111.392 | 1.825 |
| 12 | 285.934 | 91.359 | 2.056 |
| 13 | 366.692 | 61.147 | 2.312 |
| 14 | 305.455 | 63.574 | 0.815 |
| 15 | 228.151 | 50.939 | 0.649 |
| 16 | 183.750 | 55.244 | 0.687 |
| 17 | 207.681 | 60.548 | 0.803 |
| 18 | 208.899 | 64.910 | 0.266 |
| 19 | 215.220 | 62.065 | 1.480 |
| 20 | 209.594 | 56.386 | 0.643 |
| 21 | 211.536 | 44.866 | 1.014 |
| 22 | 181.970 | 56.133 | 1.525 |
| 23 | 214.453 | 54.432 | 1.212 |
| 24 | 189.645 | 59.102 | 0.982 |
| 25 | 165.595 | 60.586 | 0.503 |
| 26 | 134.778 | 45.946 | 0.561 |
| 27 | 117.080 | 53.040 | 0.637 |
| 28 | 136.939 | 50.832 | 1.116 |
| 29 | 159.551 | 54.205 | 0.662 |
| 30 | 154.380 | 53.140 | 0.304 |
| 31 | 132.183 | 44.501 | 0.489 |
| 32 | 127.717 | 46.703 | 0.246 |
| 33 | 123.587 | 44.912 | 0.669 |
| 34 | 105.164 | 39.657 | 0.171 |
| 35 | 83.192 | 38.048 | 1.071 |
| 36 | 74.353 | 38.001 | 2.177 |
| 37 | 68.599 | 63.353 | 0.560 |
| 38 | 72.624 | 72.258 | 0.604 |
| 39 | 51.708 | 71.366 | 0.687 |
| 40 | 47.386 | 56.280 | 0.918 |
| 41 | 51.293 | 54.086 | 0.400 |
| 42 | 57.556 | 53.641 | 0.202 |
| 43 | 46.705 | 45.374 | 0.713 |
| 44 | 48.880 | 50.636 | 0.259 |
| 45 | 42.621 | 47.829 | 0.176 |
| 46 | 50.145 | 64.777 | 0.457 |
| 47 | 51.553 | 48.020 | 0.157 |
| 48 | 30.007 | 56.961 | 0.361 |
| 49 | 27.497 | 48.719 | 0.316 |
| 50 | 22.721 | 51.235 | 0.150 |
| 51 | 23.701 | 41.031 | 0.483 |
| 52 | 21.440 | 46.916 | 0.208 |
| 53 | 28.382 | 43.376 | 0.183 |
| 54 | 23.815 | 41.702 | 0.368 |
| 55 | 24.195 | 40.296 | 0.093 |
| 56 | 21.726 | 45.059 | 0.118 |
| 57 | 18.348 | 38.086 | 0.163 |
| 58 | 23.181 | 34.671 | 0.189 |
| 59 | 19.850 | 33.704 | 0.271 |
| 60 | 17.325 | 33.625 | 0.124 |
| 61 | 14.124 | 31.880 | 0.566 |
| 62 | 16.739 | 31.568 | 0.157 |
| 63 | 12.679 | 24.869 | 0.157 |
| 64 | 12.663 | 27.233 | 0.132 |
| 65 | 13.341 | 28.540 | 0.630 |
| 66 | 22.479 | 27.536 | 0.112 |
| 67 | 21.549 | 23.552 | 0.189 |
| 68 | 24.242 | 21.731 | 0.291 |
| 69 | 15.035 | 21.994 | 0.175 |
| 70 | 14.031 | 29.085 | 0.092 |
| 71 | 15.098 | 24.018 | 0.413 |
| 72 | 34.829 | 24.096 | 0.285 |

TABLE 1-continued

| Time (sec) | Regular ZB (0.1%) mg/m^3 | Low Dust ZB (2%) mg/m^3 | Low Dust ZB (5%) mg/m^3 |
|---|---|---|---|
| 73 | 62.353 | 14.670 | 0.291 |
| 74 | 67.237 | 19.307 | 0.144 |
| 75 | 49.795 | 20.640 | 0.201 |
| 76 | 44.578 | 26.894 | 0.092 |
| 77 | 38.458 | 28.187 | 0.188 |
| 78 | 37.494 | 28.973 | 0.087 |
| 79 | 34.156 | 28.170 | 0.094 |
| 80 | 26.352 | 25.392 | 0.094 |
| 81 | 23.487 | 19.656 | 0.093 |
| 82 | 22.234 | 16.553 | 0.208 |
| 83 | 20.825 | 16.183 | 0.106 |
| 84 | 16.236 | 13.409 | 0.150 |
| 85 | 13.068 | 13.780 | 0.163 |
| 86 | 12.181 | 15.048 | 0.156 |
| 87 | 10.844 | 11.622 | 0.259 |
| 88 | 8.613 | 11.358 | 0.093 |
| 89 | 19.928 | 11.509 | 0.636 |
| 90 | 22.156 | 11.361 | 0.119 |
| 91 | 10.412 | 10.502 | 0.163 |
| 92 | 7.448 | 10.743 | 0.112 |
| 93 | 8.353 | 9.981 | 0.094 |
| 94 | 10.379 | 9.218 | 0.112 |
| 95 | 12.340 | 9.877 | 0.086 |
| 96 | 13.369 | 9.034 | 0.137 |
| 97 | 28.763 | 8.502 | 0.125 |
| 98 | 24.502 | 10.564 | 0.113 |
| 99 | 16.030 | 10.845 | 0.125 |
| 100 | 17.798 | 10.279 | 0.144 |
| 101 | 15.997 | 14.413 | 0.106 |
| 102 | 24.627 | 12.551 | 0.106 |
| 103 | 20.403 | 11.216 | 0.164 |
| 104 | 19.734 | 10.860 | 0.099 |
| 105 | 21.760 | 7.504 | 0.105 |
| 106 | 17.173 | 8.757 | 0.099 |
| 107 | 14.354 | 8.537 | 0.092 |
| 108 | 21.742 | 7.837 | 0.131 |
| 109 | 16.033 | 9.676 | 0.112 |
| 110 | 13.354 | 7.620 | 0.093 |
| 111 | 10.308 | 9.648 | 0.099 |
| 112 | 7.712 | 10.047 | 0.099 |
| 113 | 7.789 | 12.662 | 0.100 |
| 114 | 9.892 | 11.253 | 0.119 |
| 115 | 8.558 | 7.434 | 0.126 |
| 116 | 8.602 | 8.560 | 0.106 |
| 117 | 6.727 | 7.859 | 0.093 |
| 118 | 6.831 | 7.234 | 0.157 |
| 119 | 6.179 | 9.713 | 0.105 |
| 120 | 5.649 | 6.050 | 0.112 |

TABLE 2

| Moisture Content % | Mean Time to Avalanch sec |
|---|---|
| 0.1 | 2.99 |
| 1 | 3.00 |
| 2 | 3.30 |
| 5 | 2.74 |

TABLE 2-continued

| Moisture Content % | Mean Time to Avalanch sec |
|---|---|
| 10 | 3.45 |
| 20 | 4.34 |

What is claimed is:

1. In the method for forming lignocellulosic composite products such as to increase their resistance to fungal and insect attack, the improvement consists of incorporating an additive consisting of at least one boron compound selected from the group of zinc borate and calcium borate and a dust reducing amount of moisture from about 2.0 to about 10.0 percent by weight prior to forming said lignocellulosic composite product.

2. The method according to claim 1 in which said at least one boron compound is incorporated from about 0.2 to 3.0 percent by weight of said lignocellulosic composite product.

3. The method according to claim 1 in which said at least one boron compound is zinc borate incorporated from about 0.2 to 3.0 percent by weight of said lignocellulosic composite product.

4. The method according to claim 1 in which said at least one boron compound is calcium borate incorporated from about 0.2 to 3.0 percent by weight of said lignocellulosic composite product.

5. The method according to claim 4 where the calcium borate is a synthetic borate.

6. The method according to claim 4 where the calcium borate is selected from the group consisting of nobleite, gowerite, ulexite, and colemanite.

7. The method according to claim 1 in which the lignocellulosic material is selected from the group consisting of wood, flax, hemp, jute, bagase and straw.

8. The method according to claim 1 in which the lignocellulosic material is wood.

9. The method according to claim 1 in which said at least one boron compound is combined with a lignocellulosic material and a binder, and said lignocellulosic composite product is formed with heat and pressure.

10. The method according to claim 8 in which wood strands are combined with said at least one boron compound and a heat cured adhesive resin, the resultant mixture is formed into a mat, and said mat is heated under pressure to form said lignocellulosic composite product.

11. The method according to claim 10 in which said heat cured adhesive resin is selected from the group consisting of the formaldehyde- and isocyanate-based resins.

12. The method according to claim 10 in which said heat cured adhesive resin is selected from the group consisting of phenol-formaldehyde, phenol resorcinol formaldehyde, urea-formaldehyde and dehenyhmethanediisocyanate.

* * * * *